United States Patent Office 3,634,463
Patented Jan. 11, 1972

3,634,463
PROCESS FOR PREPARING (±) (CIS-1,2-EPOXY-PROPYL)PHOSPHONIC ACID ESTERS AND SALTS
Raymond A. Firestone, Fanwood, N.J., assignor to Merck & Co., Inc., Rahway, N.J.
No Drawing. Filed May 15, 1968, Ser. No. 729,413
Int. Cl. C07f 9/38, 9/40
U.S. Cl. 260—348 R
8 Claims

ABSTRACT OF THE DISCLOSURE

Process for preparing (±)(cis-1,2-epoxypropyl)phosphonic acid and its esters and salts which comprise treating methyl ketene with an appropriately substituted phosphonate in the presence of a catalyst. The (±)(cis-1,2-epoxypropyl)phosphonic acid and its salts are useful as antibacterial agents.

This invention relates to a novel method for the preparation of (±)(cis-1,2-epoxypropyl)phosphonic acid and its corresponding salts and esters by treating methyl ketene with an appropriate di-substituted phosphonate.

The (±)(cis-1,2-epoxypropyl)phosphonic acid and its salts such as the sodium and calcium salts are useful as antibacterial agents, which inhibit the growth of both gram-positive and gram-negative pathogenic bacteria, and are active against Bacillus, Escherichia, Staphylococci Salmonella and Proteus pathogens, and antibiotic-resistant strains thereof. Illustrative of such pathogens are *Bacillus subtilis, Escherichia coli, Salmonella schottmuelleri, Salmonella gallinarum, Salmonella pullorum, Proteus vulgaris, Proteus mirabilis, Proteus morganii, Staphylococcus aureus* and *Staphylococcus pyogenes*. Thus, (±)(cis-1,2-epoxypropyl)phosphonic acid and salts thereof can be used as antiseptic agents to remove susceptible organisms from pharmaceutical, dental, and medical equipment and other areas subject to infection by such organisms. Similarly, they can be used to separate certain microorganisms from mixtures of microorganisms. Salts of (±)(cis-1,2-epoxypropyl)phosphonic acid are also useful in the treatment of diseases caused by bacterial infections and is particularly valuable in this respect, since it is active against resistant strains of pathogens. These salts are especially valuable, since they are effective when given orally, although they can also be administered parenterally.

In addition, the salts of (±)(cis-1,2-epoxypropyl) phosphonic acid are useful as preservatives in industrial applications since they effectively inhibit undesirable bacterial growth in the white water used in paper mills and in paints, e.g. in polyvinyl acetate latex paint.

In accordance with this invention, the (±)(cis-1,2-epoxypropyl)phosphonic acid and its esters and salt derivatives are prepared by treating methyl ketene with a di-substituted phosphonate in the presence of a catalyst. The following equation illustrates the process of this invention:

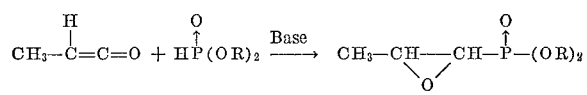

wherein the R radical is selected from among alkyl, especially lower alkyl such as methyl, ethyl, propyl, isopropyl, butyl, tertiary butyl and the like; alkenyl such as allyl and the like; alkynyl such as propargyl and the like; mononuclear aralkyl such as benzyl and the like; mononuclear aryl such as phenyl and the like; and an alkali metal ion such as the sodium ion and the like with the proviso that when R is an alkali metal ion a catalyst is not used. The isomeric mixture of the ester derivatives of (±)(1,2-epoxypropyl)phosphonic acid are separated by chromatography as for example by gas chromatography or adsorption chromatography to yield the ester derivatives of (±)(cis-1,2-epoxypropyl)phosphonic acid and also the trans isomer. The designation cis used in describing the 1,2-epoxypropyl phosphonic acid compounds means that each of the hydrogen atoms attached to carbon atoms 1 and 2 of the propylphosphonic acid are on the same side of the oxide ring. The esters of (cis-1,2-epoxypropyl) phosphonic acid obtained by the foregoing method can either be isolated per se as the product of this invention or said ester can be converted to (cis-1,2-epoxypropyl) phosphonic acid by ultraviolet irradiation, acid hydrolysis under buffered conditions or base hydrolysis followed by enzymolysis or by catalytic hydrogenation using Raney nickel. The salts of the acid can be prepared by treating said acid with a suitable base to yield the corresponding alkali metal or alkaline earth metal salt such as the sodium salt, calcium salt, magnesium salt and the like, or amine salt such as amine salts derived from benzylamine, ethylenediamine α-phenethylamine, quinine and the like.

Generally, any base which is inert to the reactants may be used to catalyze the reaction. Suitable catalysts include, for example, tertiary lower alkyl amines, such as triethylamine and the like, alkali metal alkoxides, such as sodium methoxide, sodium ethoxide and the like, alkali metal hydrides, such as sodium hydride, calcium hydride and the like. Any solvent which is inert to the reactants employed may be used as the diluent such as diethyl ether, tetrahydrofuran, dimethoxyethane, triethylamine and pyridine, although it will be apparent to one skilled in the art that any one of a wide variety of inert solvents may be used with equally good results. Due to the low boiling point of the reactant, methyl ketene, the reaction temperature is preferably kept below 30° C. when the reaction is run at atmospheric pressure.

The following examples illustrate a method for preparing the (±)(1,2-epoxypropyl)phosphonic acid and its esters and salts according to the process of this invention. However, the examples are illustrative only and it will be apparent to one having ordinary skill that all the products of this invention may be prepared by substituting the appropriate starting materials for those described in the examples.

EXAMPLE 1

(±)(Cis-1,2-epoxypropyl)phosphonic
acid and dimethyl ester

Step A: Dimethyl (±)(cis-1,2-epoxypropyl)phosphonate.—To a solution of dimethyl phosphonate (11.0 g., 0.1 mole) and methylketene (5.5 g., 0.1 mole) in ether (165 ml.) at ambient temperature is added triethylamine (0.5 g., 0.005 mole). The reaction mixture is stirred for 24 hours and then filtered. The solvent is removed under vacuum and the residue fractionally distilled to yield dimethyl (±)(1,2-epoxypropyl)phosphonate, which on chromatographic separation, using Fluorisil as an adsorbant, yields dimethyl (±)(cis-1,2-epoxypropyl)phosphonate.

Step B: (±) (Cis-1,2-epoxypropyl)phosphonic acid and monodiethylamine salt.—Dimethyl (±) (cis - 1,2-epoxypropyl)phosphonate (4.0 g.) is refluxed gently in trimethyl chlorosilane for 30 minutes. The solvent is removed and the residue dissolved in cold water containing a catalytic amount of hydrochloric acid. A stoichiometric amount of diethylamine is then added to the soluton containing (±) (cis-1,2 - epoxypropyl)phosphonic acid, the solvent is evaporated under reduced pressure to yield the monodiethylamine salt of (±) cis-1,2-epoxypropyl)phosphonic acid.

EXAMPLE 2

(±) (Cis-1,2-epoxyproyl)phosphonic acid and diethyl ester

Step A: Dietyl (±) (cis - 1,2-epoxypropyl)phosphonate.—To a solution of diethyl phosphonate (13.5 g., 0.1 mole) and methylketene (5.5 g., 0.1 mole) in ether (190 ml.) at −20° C. is added sodium methoxide (0.07 g., 0.001 mole). The reaction mixture is stirred for two hours at −20° C. It is then filtered and the solvent removed under vacuum. The residue is vacuum distilled to yield diethyl (±) (1,2 - epoxypropyl)phosphonate. Chromatographic separation of the isomeric mixture yields diethyl (±) (cis-1,2-epoxypropyl)phosphonate.

Step B: Mono-ethyl (±) (cis-1,2-epoxypropyl)phosphonate.—Diethyl (±) (cis-1,2 - epoxypropyl)phosphonate (10.0 g., 0.052 mole) is stirred with 25 ml. of an aqueous sodium hydroxide (2.08 g., 0.052 mole) solution at room temperature. The solvent is removed under vacuum to yield sodium ethyl (±) (cis-1,2-epoxypropyl) phosphonate.

Step C: Mono-sodium salt of (±) (cis-1,2-epoxypropyl)-phosphonic acid.—40 ml. of a medium consisting of 0.8% nutrient broth, 0.2% yeast extract, 3% cerelose and 0.3% malt extract, adjusted to pH 7.0, is autoclaved for 15 minutes in a 250 ml. Erlenmeyer flask at 121° C. and 15 p.s.i. The medium is then inoculated with a loopful of inoculum from an agar slant of *Aspergillus niger*, and the flask incubated on a mechanical shaker (220 r.p.m.) at 28° C. until the cultures are well grown (2–4 days). 10 ml. of the fermentation broth is then aseptically transferred to a centrifuge tube and the cells pelleted at 25,000×$g$. The supernatant is discarded and the cells re-suspended in 4 ml. of distilled water. 2 ml. of this cell suspension are aseptically transferred to a sterile 20 x 200 mm. test tube containing 2γ of sodium ethyl (±) (cis-1,2-epoxypropyl) phosphonate in 2 ml. of water. The tube is incubated for 20 hours at 28° C. on a mechanical shaker (220 r.p.m.). The cells are then removed by centrifugation (25,000×$g$). The supernatant is evaporated to dryness in vacuo to afford sodium (±) (cis-1,2-epoxypropyl)phosphonate.

By substituting for the diethyl phosphonate in Example 2, Step A, an equimolar quantity of di-n-propyl phosphonate, diisopropyl phosphonate, and finally di-n-butyl phosphonate, and by following the procedure described therein, there is obtained respectively di-n-propyl (±) (cis-1,2-epoxypropyl)phosphonate, diisopropyl (±) (cis-1,2-epoxypropyl)phosphonate, and di-n-butyl (±) (cis-1,2-epoxypropyl)phosphonate.

EXAMPLE 3

(±) (Cis)-1,2-epoxypropyl)phosphonic acid and ditertiary butyl ester

Step A: (±) (Cis-1,2-epoxypropyl)phosphonic acid and ditertiary butyl ester.—To a solution of ditertiary butyl phosphonate (19.4 g., 0.1 mole) and methylketene (5.5 g., 0.1 mole) in ether (200 ml.) at room temperature is added triethylamine (0.5 g., 0.005 mole). After the reaction mixture has been stirred for 24 hours, it is filtered and the solvent removed under vacuum. The residue is fractionally distilled under vacuum to yield ditertiary butyl (±) (1,2-epoxypropyl)phosphonate, which is then chromatographed to yield the cis isomer, that is, ditertiary butyl (±) (cis-1,2-epoxypropyl)phosphonate.

Step B: (±) (Cis-1,2-epoxypropyl)phosphonic acid and dibenzylamine salt.—Ditertiary butyl (±) (cis-1,2-epoxypropyl)phosphonate (3.0 g., 0.0125 mole) is dissolved in tetrahydrofuran (15 ml.) and toluene sulfonic acid (2.16 g., 0.0125 mole) added. After stirring for 15 minutes, the solution is brought to neutrality by the addition of benzylamine. Evaporation of the solvent under vacuum yields the dibenzylamine salt of (±) (cis-1,2-epoxypropyl)phosphonic acid.

EXAMPLE 4

(±) (Cis-1,2-epoxypropyl)phosphonic acid and dibenzyl ester

Step A: Dibenzyl (±) (cis-1,2-epoxypropyl)phosphonate.—By substituting in Example 2, Step A, for the diethyl phosphonate an equimolar quantity of dibenzyl phosphonate and by following the procedure described therein, there is obtained dibenzyl (±) (cis-1,2-epoxypropyl)phosphonate.

Step B: (±) (Cis-1,2-epoxypropyl)phosphonic acid monodiethylamine salt.—To a solution of dibenzyl (±) (cis-1,2-epoxypropyl)phosphonate (3.08 g., 0.01 mole) and diethyl amine (0.73 g., 0.01 mole) in ethanol (20 ml.) is added Raney nickel (1.0 g.). The mixture is shaken with hydrogen under 40 p.s.i. of pressure at room temperature until the calculated hydrogen uptake for the removal of two benzyl groups is reached. The reaction mixture is then filtered free of the catalyst and the solvent removed under vacuum to yield the monodiethylamine salt of (±) (cis-1,2-epoxypropyl)phosphonic acid.

By substituting for the dibenzyl phosphonate of Example 4, Step A, an equimolar quantity of diallyl phosphonate and dipropargylphosphonate and by following the procedure described therein, there is obtained respectively diallyl (±) (cis-1,2-epoxypropyl)phosphonate and dipropargyl (±) (cis-1,2-epoxypropyl)phosphonate.

EXAMPLE 5

(±) (Cis-1,2-epoxypropyl)phosphonic acid and diphenyl ester

Step A: Diphenyl (±) (cis-1,2-epoxypropyl)phosphonate.—A solution of diphenyl phosphonate (23.4 g., 0.1 mole) and methyl ketene (5.5 g., 0.1 mole) in triethylamine (290 ml.) is stirred for 24 hours. The reaction mixture is filtered and the solvent removed from the filtrate. The residue is fractionally distilled under vacuum to yield diphenyl (±) (cis-1,2-epoxypropyl)phosphonate. Chromatographic separation of the isomeric mixture yields diphenyl (±) (cis-1,2-epoxypropyl)phosphonate.

Step B: (±)(Cis-1,2-epoxypropyl)phosphonic acid and disodium salt.—A solution of diphenyl (±)(cis-1,2-epoxypropyl)phosphonate in 30% ethanol-water is refluxed with a two-fold excess of barium hydroxide under a nitrogen atmosphere for one and one-half hours. The reaction mixture is cooled and adjusted to a pH of 8 with ammonium sulfate. The reaction mixture is then extracted with ethylacetate and the aqueous phase stirred overnight at room temperature with sodium sulfate (30 g.). The aqueous phase is filtered and the filtrate is evaporated at reduced pressure to yield the disodium salt of (±)(cis-1,2-epoxypropyl)phosphonic acid.

EXAMPLE 6

Disodium salt of (±)(cis-1,2-epoxypropyl) phosphonic acid

A suspension of disodium phosphonate (12.6 g., 0.1 mole) and methylketene (5.5 g., 0.1 mole) in dioxane (180 ml.) is stirred for four days at 30° C. The suspension is filtered to collect the disodium salt of (±)(1,2-epoxypropyl)phosphonic acid. Fractional recrystallization yields the disodium salt of (±)(cis-1,2-epoxypropyl)phosphonic acid.

One skilled in the art will appreciate that the processes disclosed in the above examples are merely illustrative and are capable of wide variation and modification without departing from the spirit of this invention.

What is claimed is:

1. A process for preparing a compound of the formula:

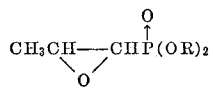

wherein R is lower alkyl, lower alkenyl, lower alkynyl, mononuclear aralkyl or mononuclear aryl, which comprises reacting methyl ketene with a compound of the formula:

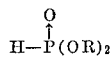

wherein R is as defined above, in the presence of a base.

2. The process of claim 1 wherein R is lower alkyl.
3. The process of claim 1 wherein R is mononuclear aralkyl.
4. The process of claim 1 wherein R is alkenyl.
5. The process of claim 1 wherein R is benzyl.
6. The process of claim 1 wherein R is tert-butyl.
7. The process of claim 8 wherein R is sodium.
8. A process for preparing a compound of the formula:

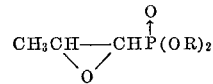

wherein R is an alkali metal, which comprises reacting methyl ketene with a compound of the formula:

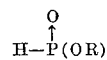

wherein R is as defined above.

References Cited
FOREIGN PATENTS 449,875    7/1936    Great Britain _____ 260—348

OTHER REFERENCES

Houben-Weyl, Methoden der Organischen Chemie, vol. 12/1 (1963), p. 474.

Zimakov, P. V., Okis Etilena (1946), p. 102.

Ellis, Carleton, The Chemistry of Petroleum Derivatives, vol. II (1937), p. 553.

NORMA S. MILESTONE, Primary Examiner

U.S. Cl. X.R.

424—278